US006862735B1

(12) United States Patent
Slaughter et al.

(10) Patent No.: US 6,862,735 B1
(45) Date of Patent: Mar. 1, 2005

(54) MECHANISM BY WHICH PLATFORM INDEPENDENT SOFTWARE MAY BIND TO AND ACCESS PLATFORM DEPENDENT SOFTWARE

(75) Inventors: Gregory L. Slaughter, Palo Alto, CA (US); Thomas E. Saulpaugh, San Jose, CA (US); Bernard A. Traversat, San Francisco, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/249,229

(22) Filed: Feb. 11, 1999

(51) Int. Cl.[7] .............................................. G06F 9/54
(52) U.S. Cl. ...................... 719/315; 719/321; 717/118
(58) Field of Search .............................. 719/321–327, 719/315–316; 717/146–148, 118, 220; 709/310–332; 713/1

(56) References Cited

U.S. PATENT DOCUMENTS

| 5,309,563 | A | * | 5/1994 | Farrand | 709/216 |
|---|---|---|---|---|---|
| 5,491,813 | A | * | 2/1996 | Bondy | 709/327 |
| 5,519,867 | A | * | 5/1996 | Moeller | 709/328 |
| 5,893,926 | A | * | 4/1999 | Saxena | 711/170 |
| 6,134,616 | A | * | 10/2000 | Beatty | 710/104 |
| 6,195,694 | B1 | * | 2/2001 | Chen et al. | 709/220 |
| 6,202,146 | B1 | * | 3/2001 | Slaughter et al. | 713/1 |
| 6,202,147 | B1 | * | 3/2001 | Slaughter et al. | 713/1 |
| 6,233,611 | B1 | * | 5/2001 | Ludtke | 709/223 |
| 6,434,694 | B1 | * | 8/2002 | Slaughter et al. | 713/1 |
| 6,594,708 | B1 | * | 7/2003 | Slaughter et al. | 719/315 |

OTHER PUBLICATIONS

Douglas Kramer, "The Java Platform The White Paper", May 1996.*

* cited by examiner

Primary Examiner—St. John Courtenay, III
(74) Attorney, Agent, or Firm—Beyer, Weaver & Thomas, LLP.

(57) ABSTRACT

Methods and apparatus for a platform independent object to bind to and access platform dependent software are disclosed. According to one aspect of the present invention, a software object that includes a wrapper and an associated platform dependent software. The platform independent object calls the wrapper. The wrapper, in turn, directly calls the associated platform dependent method. In this way, a platform independent object accesses the platform dependent method by directly calling the wrapper associated with the method.

23 Claims, 6 Drawing Sheets

MECHANISM BY WHICH PLATFORM INDEPENDENT SOFTWARE MAY BIND TO AND ACCESS PLATFORM DEPENDENT SOFTWARE

BACKGROUND OF THE INVENTION

1. The Field of the Invention

The present invention relates to the field of computing, and more particularly, to software, methods and systems that facilitate platform independent software binding to and accessing platform dependent software.

2. Description of Relevant Art

In recent years significant efforts have been made to facilitate the creation of platform independent software. This is, software that can execute on multiple different platforms (e.g. different types of computer system), without requiring the software program to be rewritten or customized to operate on specific platforms. By way of example, the Java programming language is designed to facilitate the creation of Java software objects that are platform independent. However, in certain situations, it is desirable for a particular software object to make use of specific platform dependent code to access specific hardware functionality. One such class of software objects is device drivers.

A device driver is software used to control hardware coupled with the computer system. Usually, the peripheral device functions to provide data input and/or output ("I/O") to the computer system. Examples of peripheral devices include keyboards, printers, scanners, network interface and graphics cards, modems, and monitors. In general, device drivers process data being to be sent to or retrieved from the peripheral device by the computer system so that the data is transferred in a format suitable for processing by the peripheral device or computer system.

The intimate association between the device driver and the hardware and software of both the peripheral device and the computer system to which the device is couple has required that device drivers be written in a highly platform-dependent manner. For example, device drivers generally must obtain memory resources when called to perform their function. Typically, this requires the allocation of memory resources that must be described by the driver. The driver must therefor have specific knowledge about the platform in order to make such a request. Thus, the same peripheral device, e.g., a printer, will require different version of device (printer) driver software for each platform.

The platform dependence of driver software thus increases the costs of developing platforms and peripherals, as manufactures of peripherals and computer operating systems must provide new versions and updates of driver software for new peripherals, new software platforms, and new operating system releases. Platform-dependent driver technology also increases the cost of maintaining computer systems, especially diverse computer systems deployed over networks, as system managers must obtain and install new and updated device drivers to enable user access to peripheral devices.

One approach to solving the problem of running platform independent software objects with platform dependent software (such as drivers) is to provide software objects that include one part that is platform independent and another part that is platform dependent. However, this "mixed" software approach is generally undesirable since such mixed objects require the platform dependent part to include different versions of the platform dependent code for each platform that the service will ultimately be loaded upon. Maintaining so many different versions in the same software object is both unwieldy and wasteful.

Therefore, it would be advantageous to provide a mechanism that provides for platform-independent software objects to efficiently bind to and access platform dependent software.

SUMMARY OF THE INVENTION

Methods and apparatus that permit platform independent software objects to access platform dependent methods are disclosed. According to one aspect of the present invention, a software object is described. The software object includes a platform dependent method and a wrapper arranged to call the platform dependent method. In one embodiment, a platform independent object accesses the platform dependent method by calling the wrapper which then calls the platform dependent method.

In some embodiments, a secure accessing arrangement is provided wherein the platform independent object requests the encapsulation object containing the platform dependent method from the system manager. A business card corresponding to the requesting object is retrieved by the system manager after which the system manager retrieves an encapsulation object pointer used to identify the encapsulation object from the business card. The identified encapsulation object is then instantiated after which the wrapper corresponding to the platform dependent method is called by the platform independent object. The wrapper then calls the platform dependent method.

According to still another aspect of the invention, a computer implemented method for transforming a mixed software object containing platform independent code and platform dependent code into a pure software object having platform independent code only is disclosed. The method includes writing an encapsulation object containing all the platform dependent code. The native encapsulation object includes a wrapper used to invoke the platform dependent code. Next, all the platform dependent code is removed from the mixed software object and all calls to the platform dependent code in the mixed software object are replaced with calls to the wrapper included in the native encapsulation object.

These and other advantages of the present invention will become apparent upon reading the following detailed descriptions and studying the various figures of the drawings.

DESCRIPTION OF THE PREFERRED EMBODIMENT

The present invention includes software, methods, and apparatus that are arranged to permit platform-independent objects to access platform dependent software. In one described embodiment of the present invention, an encapsulation object that includes a wrapper arranged to call an associated platform independent method is described. In the described embodiment, substantially the only operation performed by the wrapper is to act as an intermediary between a platform independent object and the platform dependent method to facilitate calling the platform dependent method from the platform independent service.

Figure 1:
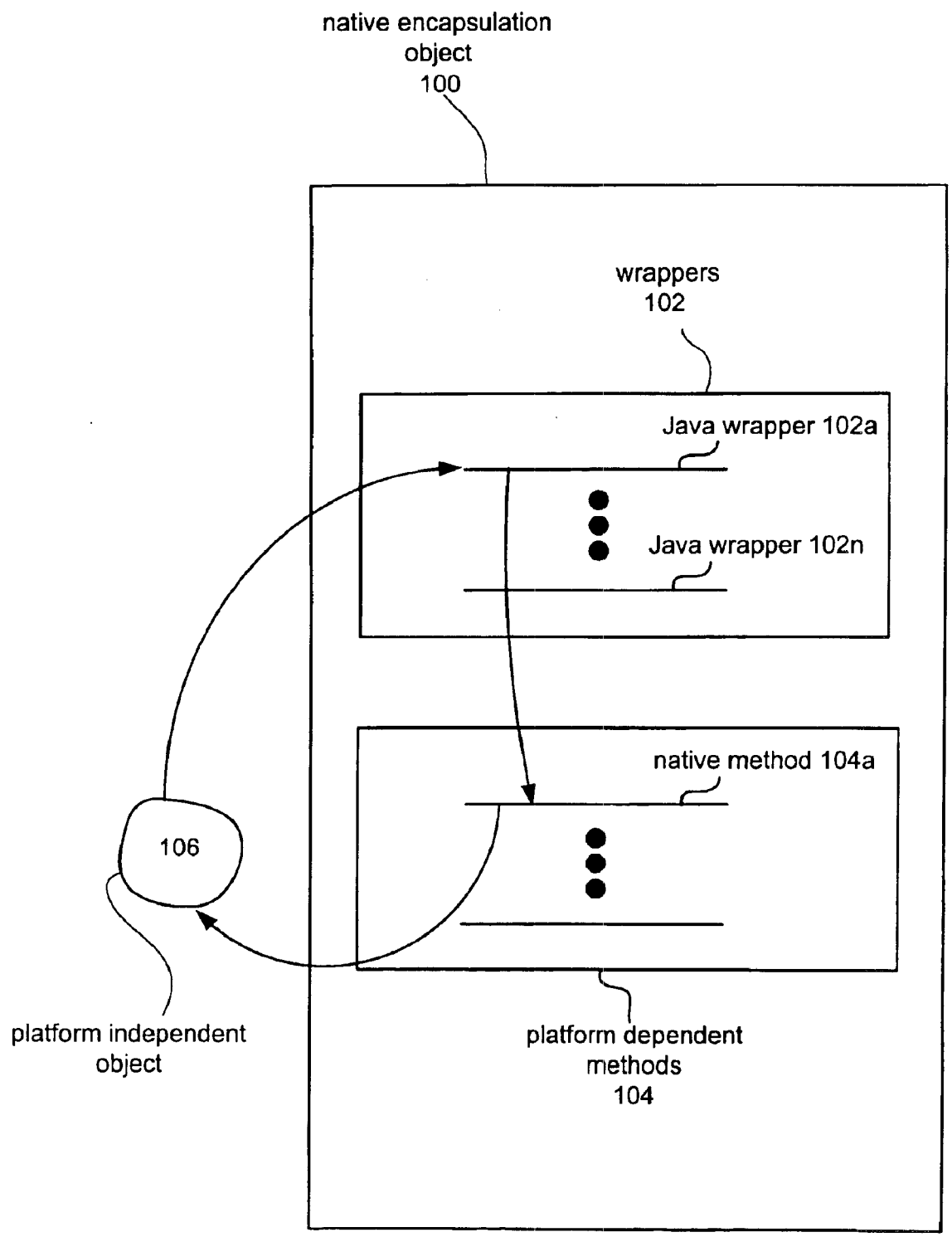
FIG. 1 illustrates a native encapsulation object (NEO) in accordance with an embodiment of the invention.

FIG. 1 illustrates a native encapsulation object 100 in accordance with an embodiment of the invention. The native encapsulation object 100 includes wrappers 102 and corresponding platform dependent methods (also referred to as native methods) 104. In on embodiment of the invention, each of the wrappers 102 is arranged to encapsulate (or call) an associated one of the platform dependent methods 104. In this way, a platform independent object, such as for example, a device driver, can access platform dependent software (represented by the native methods) using a platform independent protocol by first calling the wrappers 102 associated with the platform independent software. The wrapper, in turn, calls (or invokes) the appropriate platform dependent software, which is then accessible to the platform independent object.

In one particular embodiment, some of the wrappers 102 take the form of Java wrapper 102a through 102n that are well known to those skilled in the art. By way of example, the Java wrapper 102a is associated with a platform dependent method 104a included in the methods 104. A platform independent object 106, such as a device driver, can preserve its platform independence by first calling the Java wrapper 102a instead of directly calling the native method 104a. The Java wrapper 102a responds by directly calling the method 104a. The method 104a is then accessible to the platform independent object 106. Since the object 106 has only called the Java wrapper 102a (which is by definition platform independent) the object 106 is able to access platform dependent software represented by the native methods 104 and yet maintain its platform independence. It should be noted that the use of a Java wrapper was exemplary and should not be construed as limiting the scope or intent of the invention since any programming language can be used.

Figure 2:
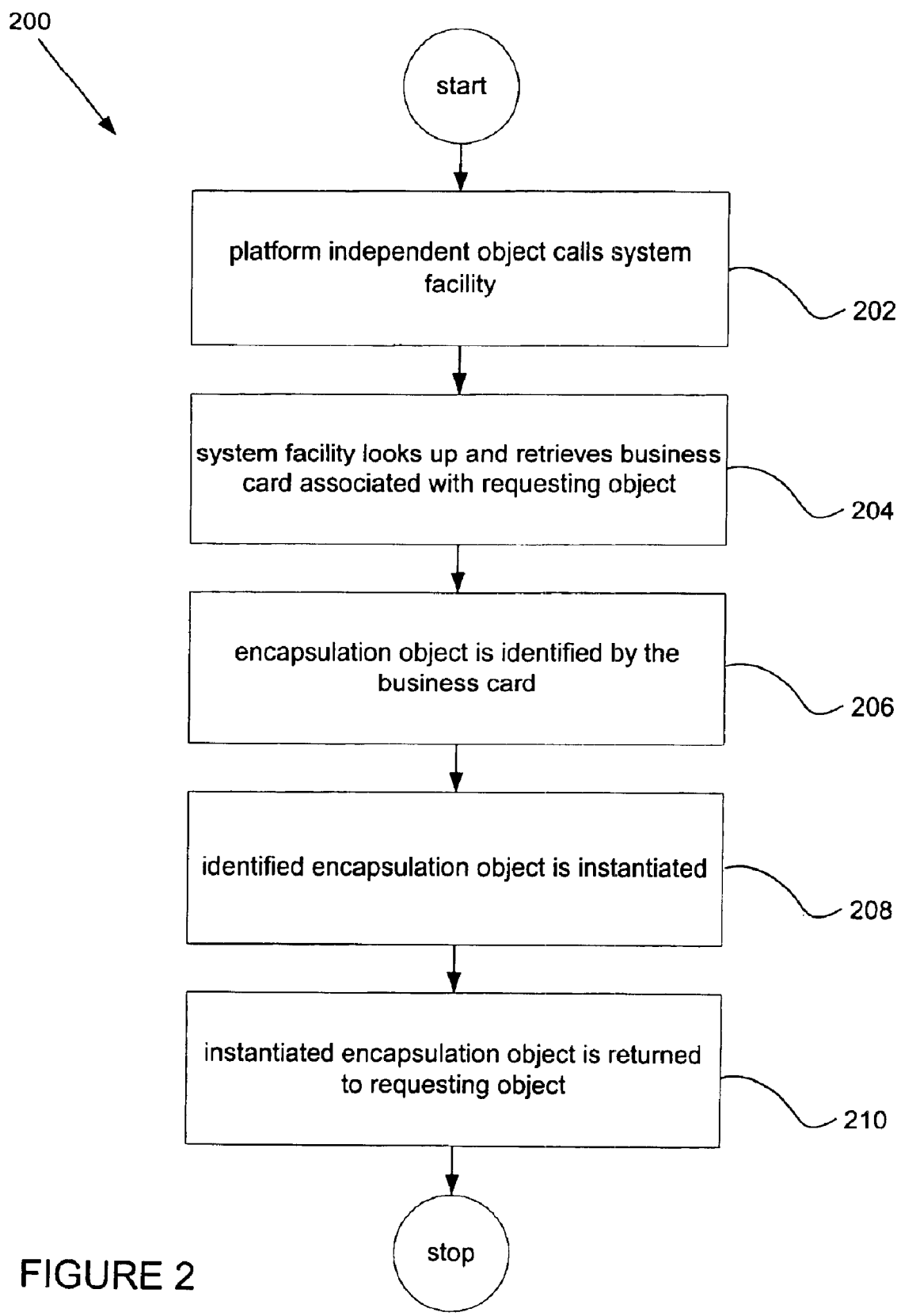
FIG. 2 is a flowchart detailing a process for a platform independent object to access platform dependent software in accordance with an embodiment of the invention.

FIG. 2 is a flowchart detailing a process 200 for allocating a native encapsulation object containing platform dependent software to be accessed by a platform independent object in a computer system in accordance with an embodiment of the invention. It should be noted that the process 200 is applicable to any platform independent software including, but not limited to, for example, device drivers.

The process 200 begins at 202 by the platform independent object calling a system facility. In one embodiment, the system facility is, in the case of Java, a bus manager. At 204, the system facility looks up and retrieves a business card associated with the requesting platform independent object. In the described embodiment, all platform independent objects have a corresponding business card that is instantiated at system startup. The business card includes configuration data that is used to identify the native encapsulation object containing the platform dependent software. At 206, the native encapsulation object containing the platform dependent software is identified by the business card. At 208, the identified native encapsulation object is instantiated and at 210 the identified native encapsulation object is returned to the requesting object.

Figure 3:
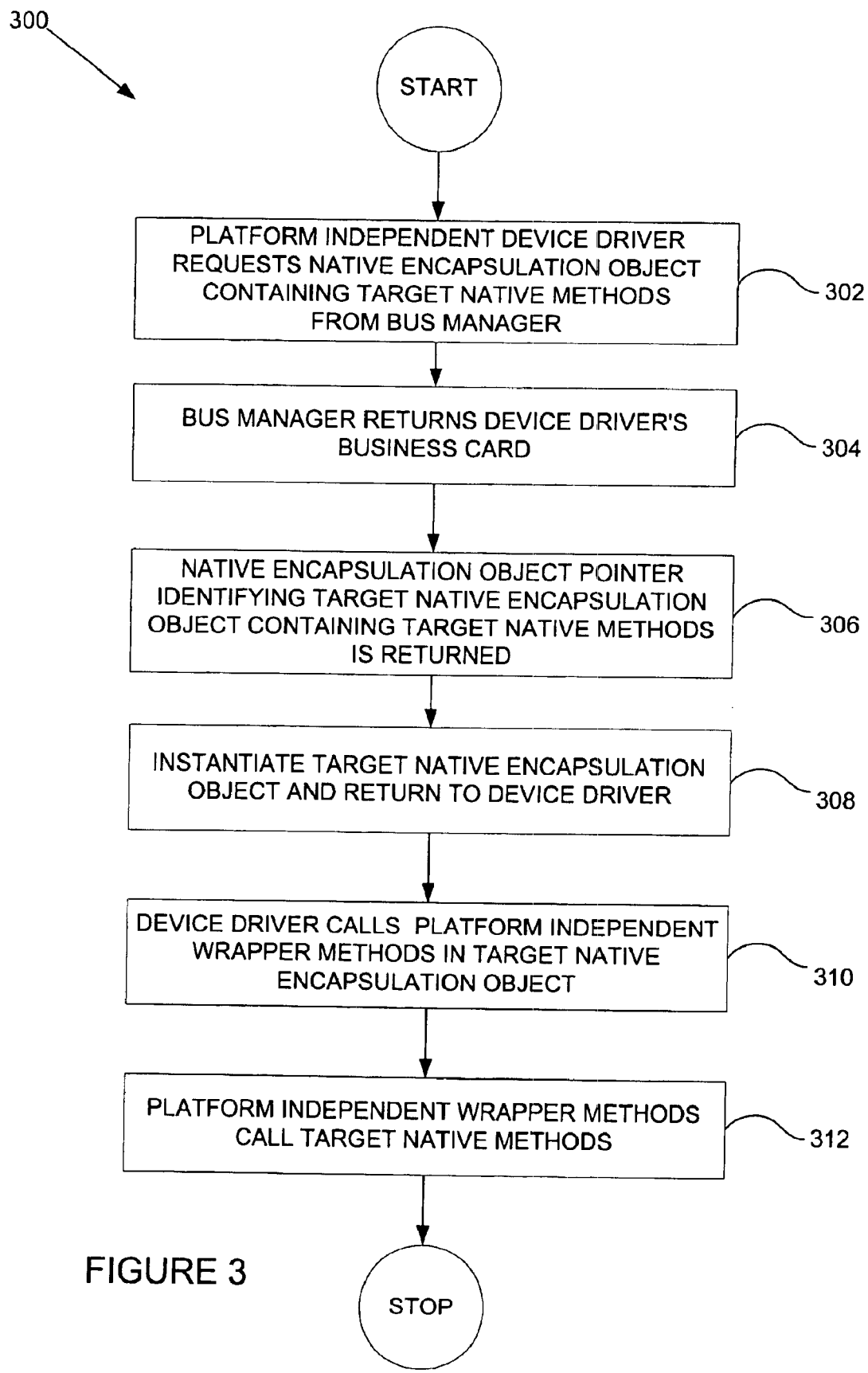
FIG. 3 is a flowchart detailing a process for a platform independent device driver binding to and accessing platform dependent software in accordance with the process detailed in FIG. 2.

FIG. 3 is a flowchart details a process 300 whereby a platform independent device driver accesses platform dependent software. It should be noted that the process 300 is a specific implementation of the process 200. Conceptually, the process 300 can be divided into an allocation portion represented by blocks 302 through 308 and an accessing portion 310 through 312. It should be realized, however, that the allocating and accessing portions are described for clarity purposes only.

The allocation portion of the process 300 begins at 302 by the platform independent device driver requesting a native encapsulation object that contains the appropriate platform dependent native methods from a bus manager connected to the device driver. The bus manager responds by returning a business card associated with the requesting device driver at 304. It should be noted, that each device driver has associated with it a business card that is, in one embodiment, populated by the system administrator at system set up with configuration data fields specific to that device driver. Such configuration data includes, in one embodiment, a NEO name useful in identifying a particular native encapsulation object such as the native encapsulation object containing the native methods to be accessed by the device driver. In a particular embodiment, the native encapsulation object pointer takes the form of a string of characters referred to as a native encapsulation object name. The native encapsulation object pointer corresponding to the native encapsulation object containing the native methods is then returned at 306. The native encapsulation object-containing the native methods and identified by the returned native encapsulation object pointer is then instantiated and returned to the device driver at 308. At this point the allocation portion is substantially complete and the accessing portion of the process 300 begins by the platform independent device driver accessing the native methods by calling the wrappers included in the native encapsulation object at 310. The wrapper responds by calling the corresponding native methods at 312.

In some cases, it is desirable to implement the above-described calls from a device driver to a bus manager (e.g., for other system services such as connecting, disconnecting, or interrogating interrupts) in a secure way. For example, it may be desirable to prevent a "rogue" device driver from identifying itself to a bus manager as another, legitimate driver. This could be useful to improve system robustness, e.g., by allowing the system to identify and isolate corrupted device drivers and thus avoid system crashes. Such a security mechanism could also be useful to prevent "spoofing" device drivers from erasing, altering, and/or copying sensitive data from the system surreptitiously. By way of example, a malicious spoofing device driver could masquerade as a printer driver and copy the data to be printed to a remote location.

One embodiment of such a security mechanism is described in detail in patent application entitled, "SECURITY FOR PLATFORM-INDEPENDENT DEVICE DRIVERS", (Ser. No. 09/106,912) by Slaughter, et al filed Jun. 29, 1998 which is incorporated in its entirety. In this way, a particular native encapsulation object whose native code performs critical functionality that affects the system hardware can be managed in a secure manner.

In another embodiment of the invention, mechanisms whereby a software object having both platform independent and platform dependent code can be transformed into two portions. One portion being platform independent and thereby loadable on any platform. The other portion being platform dependent and, as such; can be added to any platform on which the loadable platform independent portion may run.

Figure 4:
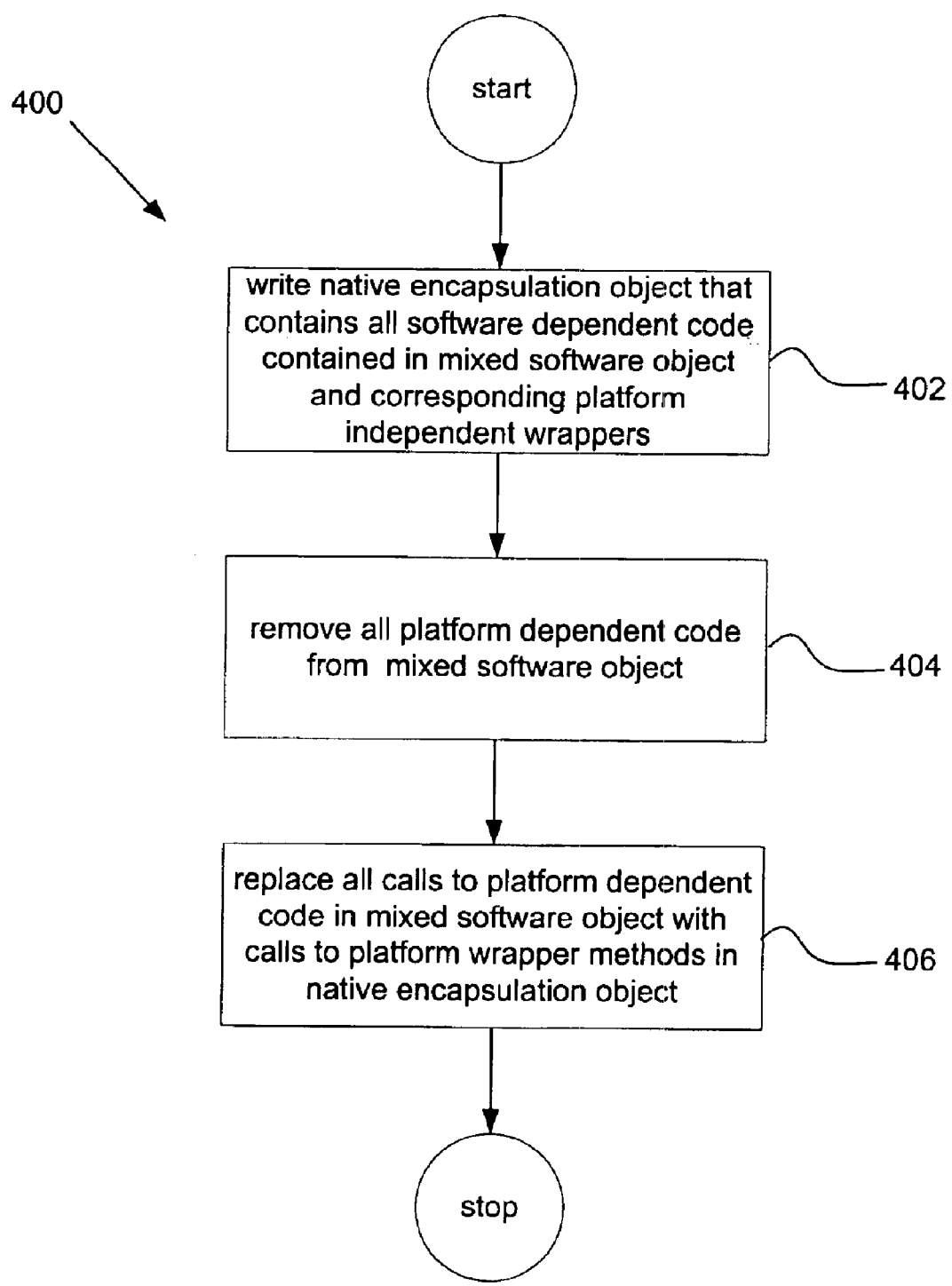
FIG. 4 shows a flowchart detailing a process for transforming a mixed software object having both platform independent and platform dependent code to a purely platform independent software object in accordance with an embodiment of the invention.

FIG. 4 shows a flowchart of a possible process 400 for transforming a mixed software object into platform independent and platform dependent portions in accordance with an embodiment of the invention. The process 400 begins at 402 by writing a native encapsulation object that contains all the platform dependent code contained in the mixed software object. Once the native encapsulation object has been written, the platform dependent code (native methods) is removed from the mixed software object at 404. Next, all calls to the native methods of the mixed software object are replaced by calls to the wrappers contained in the native encapsulation object at 406. In this way, the mixed software object has been transformed to a platform independent software.

Figure 5:
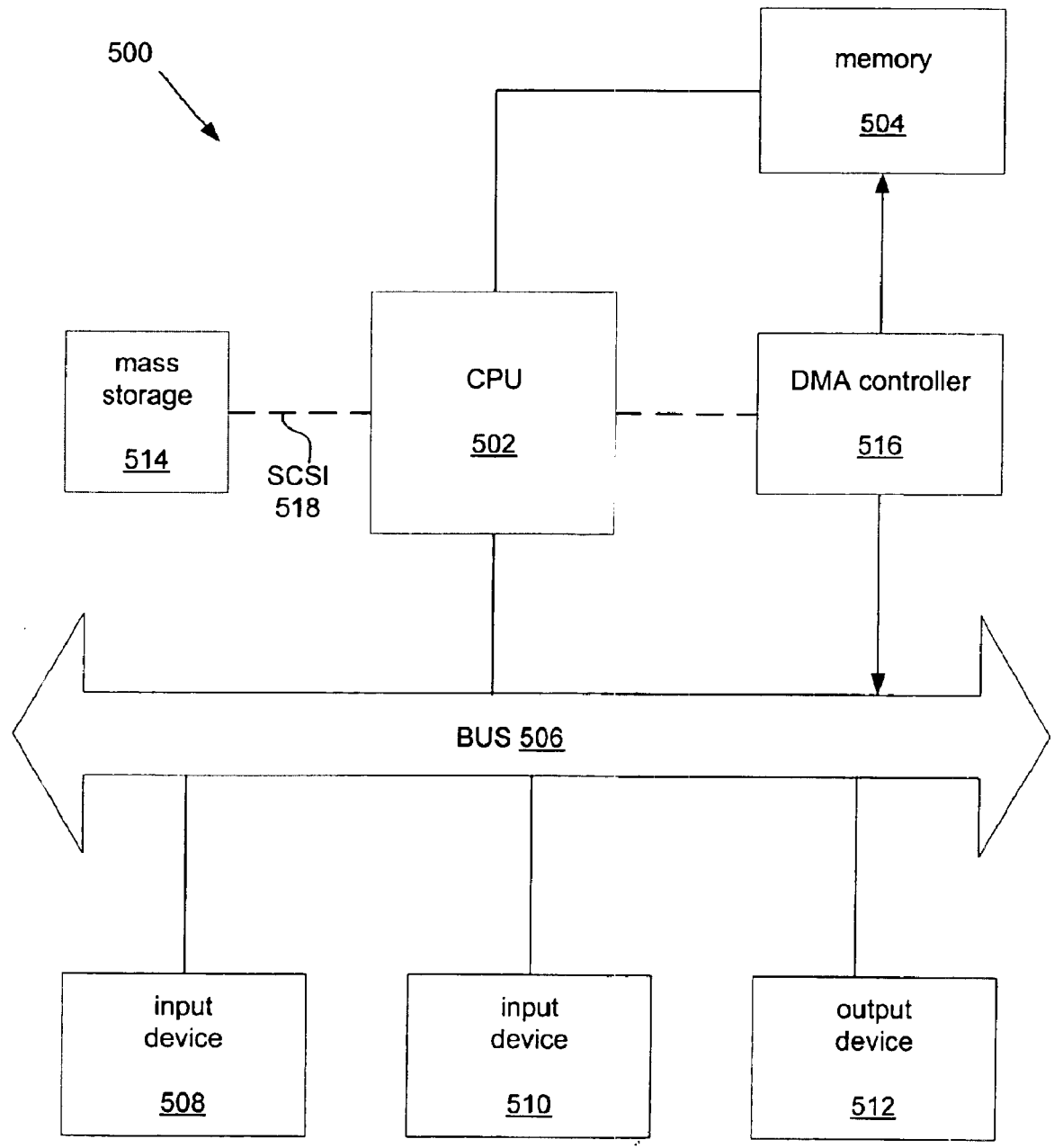
FIG. 5 is a schematic illustration of a computer system, or "platform", in accordance with the present invention.

FIG. 5 shows an example of a computer system 500 suitable for implementation of the present invention. Computer system 500 includes a central processing unit ("CPU") 502, such as, for example, a Sun Microsystems SPARC, Motorola PowerPC, or Intel Pentium processor. CPU 502 is coupled in turn with memory 504. Memory 504 can include any type of memory device used in a computer system, including random access memory ("RAM") and read-only memory ("ROM"). CPU 502 is also coupled with a bus 506, such as a PCI bus, or an S bus. A variety of input devices 508 and 510, and output devices 512 are also coupled with bus 506. Examples of such input and output devices include, but are not limited to, printers, monitors, modems, and/or network/telephone connections. Typically each of these devices has an associated driver as will be described in further detail below. Thus, for example, input device 508 could be a network interface card that connects computer system 500 to a local area network ("LAN"), input device 510 could be a keyboard, and output device 512 could be a monitor. CPU 502 can further be coupled to mass storage 514, such as a hard disk or CDROM drive, and DMA controller 516. The connection between CPU 502 and mass storage 514 can be over a second bus 518, such as a small computer system interface ("SCSI") bus.

Although computer system 500 has been illustrated using a certain configuration of hardware elements, it will be appreciated that the invention is not limited to operation on such configurations alone. Thus, computer system 500 is representative of computer systems in general terms and includes a wide variety of computing devices including, but not limited to, personal computers, mainframe or minicomputers, and "smart" systems such as set-top boxes used to access high definition television, cable, or satellite transmission as well as cellular telephones. Still more examples of computer systems suitable for use with the present invention will be apparent to those of skill in the computer science and electronics arts.

Figure 6:
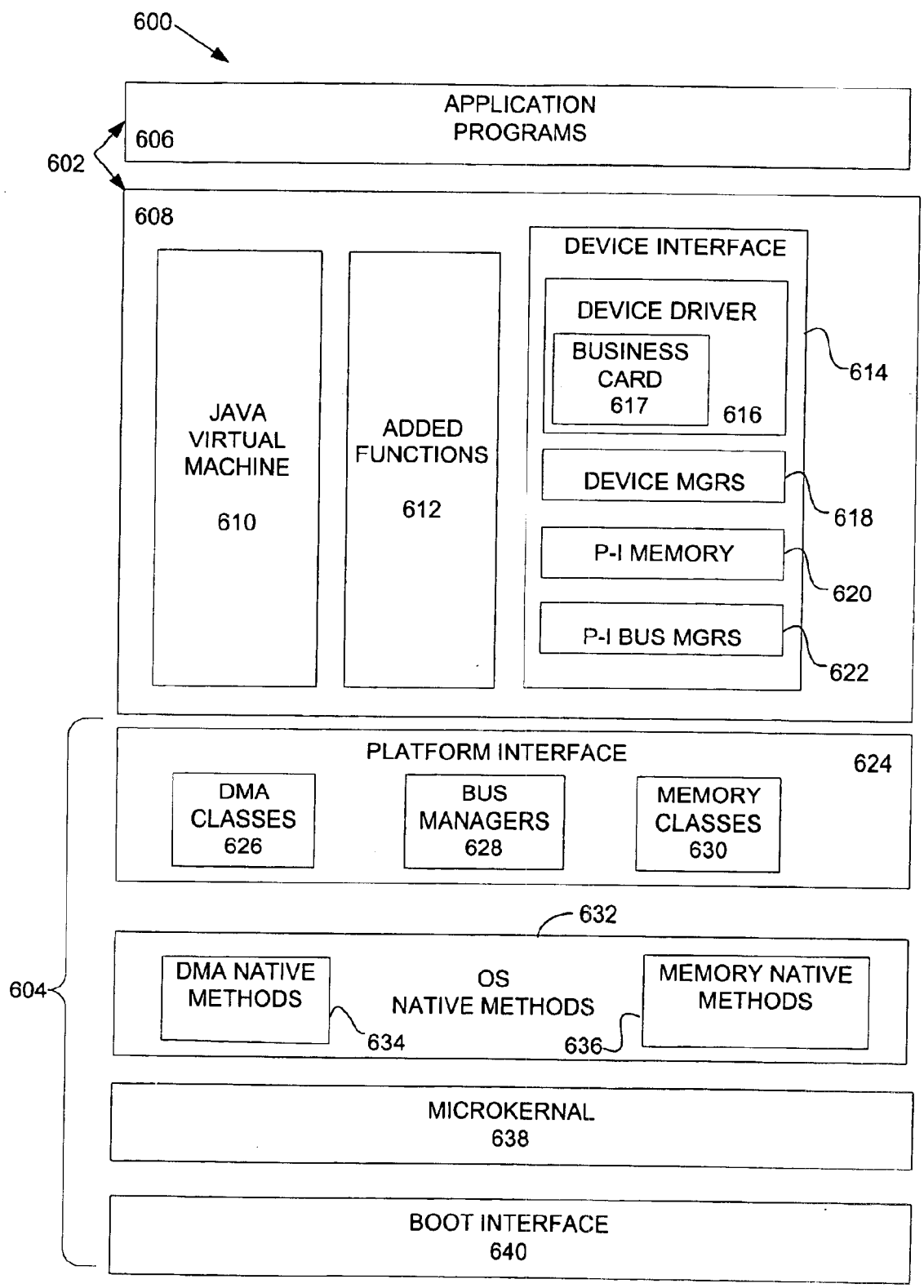
FIG. 6 is a diagram illustrating an object-oriented operating system in accordance with an embodiment the present invention.

FIG. 6 illustrates at 600 an example of software, such as stored in memory 504 and/or running on CPU 502, arranged in a series of layers. The two upper-most layers 602 include software that is platform-independent, i.e., software that is not specially configured to run on a particular computer system but that can be run on any of several computer systems. The remaining lower layers 604 are platform-dependent software, i.e., software that must be written especially for a particular computer system.

Layers 602 include an applications layer 606. Layer 606 includes software applications that are commonly run by computer users. Such software includes word processors, graphics programs, database programs, and desktop publishing programs. These applications run in conjunction with runtime system 608. Runtime system 608 includes, in one embodiment, a Java Virtual Machine ("JVM") 610 that receives instructions in the form of machineindependent bytecodes produced by the application running in applications layer 606 and interprets the instructions by converting and executing them. Other types of virtual machine can be used with the present invention, however, as will be apparent to those of skill in the computer science and electronics arts.

Runtime system 608 further includes a set of additional functions 612 that support facilities such as I/O, network operations, graphics, printing, and the like. Also included with runtime system 608 is device interface 614 that supports the operation of buses 506 and 518, and devices 508, 510, and 512. Device interface 614 includes device drivers 616, which are object-oriented programs written to support the various devices coupled with computer system 500 such as devices 508, 510, and 512. In a preferred embodiment of the invention, each of the device drivers 616 has associated with it a business card 617. The business card 617 includes configuration data specific to the associated device driver 616.

Runtime system 608 further includes device managers 618, platform-independent memory 620, and platform-independent bus managers 622 that support buses 506 and 518. Thus, it will be appreciated that device drivers 616 and bus managers 622 can be used with any platform, including platforms yet to be developed. Other various managers and components (not shown) are typically provided with device interface 614 and will be known among those skilled in the computer science and electronics arts.

Platform-dependent layers 604 include platform interface 624 that contains DMA classes 626, bus managers 628, and memory classes 630 in addition to other facilities that support runtime system 608. Additional functions are also included in platform interface 624 including interrupt classes (not shown) to support computer system 500. In one embodiment, these classes, managers, and functions are written in the Java programming language.

OS native methods 632 includes DMA native methods 634 and memory native methods 636 that are written in a language specific to CPU 502 (and thus are "native"). These methods interface with microkernel 638. Finally, at the lowest layer is boot interface 640 that supports the loading and initialization of software into memory when computer system 500 is started.

Thus, the described inventions provide methods, software, and systems for platform-independent system services. Such system services include connecting, disconnecting, or interrogating interrupts, as well as device drivers. Such device drivers can be run in a secure fashion as described above and allow greater flexibility and reduced costs of construction and maintenance. Although certain embodiments and examples have been used to describe the present invention, it will be apparent to those having skill in the art that various changes can be made to those embodiment and/or examples without departing from the scope or spirit of the present invention. For example, it will be appreciated from the foregoing that many object oriented operating systems can be used to implement the methods, software, and systems described herein using only modifications that will be apparent to those of skill in the computer science arts.

What is claimed is:

1. A software object included in a computer system, comprising:
   a platform dependant method; and
   a platform dependent wrapper arranged to encapsulate and to call the platform dependent method, wherein a platform independent object accesses the platform dependent method by calling the wrapper, wherein the wrapper then calls the platform dependent method.

2. A software object as recited in claim 1, wherein substantially the only operation performed by the wrapper is to act as an intermediary between the platform dependent object and the native method to facilitate calling the platform dependent native method from the platform independent object.

3. A software object as recited in claim 2, wherein the software object is one of a plurality of software objects included in the computer system.

4. A software object as recited in claim 3, wherein the platform dependent method is one of a plurality of platform dependent methods.

5. A software object as recited in claim 4, wherein the wrapper is one of a plurality of wrappers each being arranged to call an associated one of the plurality of platform dependent methods.

6. A software object as recited in claim 5, wherein a first software object includes a first wrapper and an associated first method designed to run on a first platform.

7. A software object as recited in claim 6, wherein a second software object includes a second wrapper and an associated second method designed to run on a second platform that is different than the first platform.

8. A software object as recited in claim 7, wherein the wrapper is a Java wrapper.

9. A software object as recited in clam 8, wherein the platform independent object is a Java device driver.

10. A computer-implemented method of accessing a platform dependent method by a platform independent object in a computer system, the computer system having an encapsulation object, the method comprising:
    calling a platform independent wrapper by the platform independent object; and
    calling the method by the wrapper wherein the wrapper encapsulates the method and the method is included in the encapsulation object.

11. A computer implemented method as recited in claim 10, wherein substantially the only operation performed by the wrapper is to act as an intermediary between the platform independent object and the method so as to facilitate calling the platform dependent method from the platform independent object.

12. A computer implemented method as recited in claim 10, wherein the encapsulation object is one of a plurality of encapsulation objects included in the computer system, and wherein the wrapper is one of a plurality of wrappers included in the computer system, and wherein the method is one of a plurality of methods included in the computer system.

13. A computer implemented method as recited in claim 12, wherein the computer system includes a first encapsulation object containing a first wrapper and an associated first method, wherein the first method is designed to run on a first platform.

14. A computer implemented method as recited in claim 13, wherein the computer system includes a second encapsulation object containing a second wrapper and an associated second method that is designed to run on a second platform that is different than the first platform.

15. A computer implemented method as recited in claim 14, wherein the platform independent object accesses the first method by calling the first wrapper that, in turn calls the first method.

16. A computer implemented method as recited in claim 14, wherein the plat independent object accesses the second method by calling the second wrapper that, in turn, calls the second method.

17. A computer implemented method of accessing a platform dependent method by a platform independent object in a compute system, the computer system including a system manager, an encapsulation object that contains the platform dependent method and a business card associated with the platform independent object, the business card containing configuration data that includes an encapsulation object pointer that is used to identify the encapsulation object containing the platform dependent method, comprising:
    requesting the encapsulation object containing the platform dependent method from the system manager by the platform independent object;
    retrieving the business card corresponding to the requesting object by the system manager;
    retrieving the encapsulation object pointer from the requesting object's business card by the system manager;
    instantiating the encapsulation object identified by the encapsulation object pointer;
    calling a platform independent wrapper contained in the encapsulation object corresponding to the platform dependent method by the platform independent object; and
    calling the platform dependent method by the wrapper.

18. The method as recited in claim 17, wherein the business card is instantiated by a system administrator at system startup.

19. The method as recited in claim 18, wherein the platform independent object is a device driver, wherein the device driver is used to manage a device coupled to the computer system.

20. The method as recited in claim 19, wherein the system manager is a bus manager used to manage a bus coupled to the device.

21. A computer implemented method of transforming a mixed software object containing platform independent code and platform dependent code into a pure software object having only platform independent code, comprising:
    instantiating an encapsulating object containing all the platform dependent code, the encapsulating object including a wrapper associated with and used to invoke the platform dependent code;
    removing all to platform dependent code from the mixed software object; and
    replacing all calls to the platform dependent code in the mixed software object with calls to the wrapper included in the native encapsulating object.

22. A computer program product for transmitting a mixed software object containing platform independent code and platform dependent code into a pure software object having platform independent code only, the computer program product comprising:
    computer code that writes an encapsulating object containing all the platform dependent code, the encapsulating object including a Java wrapper used to invoke the platform dependent code;

computer code that removes all the platform dependent code from the mixed software object; and computer code that replaces all calls to the platform dependent code in the mixed software object with calls to the wrapper included in the native encapsulating object.

23. A native on encapsulating object included in a computer system, the native encapsulation object comprising:

a plurality of device drivers; and a plurality of wrappers arranged to encapsulate and to call an associated device driver of the plurality of device drivers, wherein a platform independent object accesses an associated device driver by calling one of the plurality of wrappers, wherein the wrapper then calls the associated device driver.

* * * * *

UNITED STATES PATENT AND TRADEMARK OFFICE
CERTIFICATE OF CORRECTION

PATENT NO. : 6,862,735 B1
DATED : March 1, 2005
INVENTOR(S) : Slaughter et al.

It is certified that error appears in the above-identified patent and that said Letters Patent is hereby corrected as shown below:

Column 3,
Line 42, change "the method" to -- the platform dependent method --.

Column 7,
Lines 5 and 12, change "platform dependent" to -- platform independent --.
Line 34, change "clam 8" to -- claim 8 --.

Column 8,
Line 6, change "plat independent" to -- platform independent --.
Line 11, change "compute system" to -- computer system --.
Line 54, change "to platform" to -- the platform --.
Line 59, change "for transmitting" to -- for transforming --.

Column 9,
Line 7, change "on encapsulating" to -- encapsulation --.

Signed and Sealed this

Thirty-first Day of May, 2005

JON W. DUDAS
*Director of the United States Patent and Trademark Office*